United States Patent

Norais

[11] Patent Number: 5,979,304
[45] Date of Patent: Nov. 9, 1999

[54] SEPARATION OF SLUDGE FROM LIQUID BY PISTON-AIDED FILTRATION

[75] Inventor: Marcel Norais, Savenay, France

[73] Assignee: Elf Atochem S.A., Puteaux, France

[21] Appl. No.: 08/413,284

[22] Filed: Mar. 30, 1995

[30] Foreign Application Priority Data

Mar. 31, 1994 [FR] France ................................. 94 03814

[51] Int. Cl.⁶ ..................................................... B30B 9/04
[52] U.S. Cl. .......................... 100/37; 100/112; 100/116; 100/125; 100/207; 100/218; 100/244; 100/251
[58] Field of Search ................................ 100/37, 91, 110, 100/112, 116, 125, 193, 207, 218, 244, 247, 251

[56] References Cited

U.S. PATENT DOCUMENTS

| | | | |
|---|---|---|---|
| 1,097,157 | 5/1914 | Alvord | 100/125 |
| 1,293,833 | 2/1919 | McGary | 100/125 |
| 4,718,337 | 1/1988 | Wiederkehr | 100/193 |
| 5,146,848 | 9/1992 | Dufour | 100/112 |
| 5,277,109 | 1/1994 | Muench | 100/112 |

FOREIGN PATENT DOCUMENTS 426869  11/1947  Italy ....................................... 100/112

*Primary Examiner*—Stephen F. Gerrity

[57] ABSTRACT

An apparatus and a method using the apparatus are described for the separation by filtration of a solid phase and a liquid phase from a sludge. A pressure is exerted on the sludge with the aid of a piston in a filtration chamber having a filter. The filter is extracted from the chamber and the surface of the filter is swept using a scraper device. The invention can be used for the treatment of liquid manure.

20 Claims, 3 Drawing Sheets

SEPARATION OF SLUDGE FROM LIQUID BY PISTON-AIDED FILTRATION

BACKGROUND OF THE INVENTION

The present invention relates to an apparatus for the separation by filtration of a solid phase and a liquid phase from a sludge, slurry, or suspension, a method for separation by filtration which can be employed in the said apparatus, and the use of the said apparatus for the treatment of liquid manure. The generic term "sludge" will be used hereinbelow to denote any suspension or dispersion of a particulate solid phase in at least one liquid phase.

DESCRIPTION OF THE PRIOR ART

It is well known that it is necessary, in numerous industries, to treat a sludge in order to separate a solid phase from a liquid phase. Mention may more particularly be made of the treatment of liquid manures in order to obtain, on the one hand, solid material which can be used as compost or fertilizer and, on the other hand, a clarified, depolluted, and deodorized solution. However, mention may also be made of the treatment of effluents and sludges from purification stations and phase separations intended, in particular, to improve yields in the agro-foodstuff industries (for example, the dairy industry, the cheese industry, or the preparation of oils, coffee, fruit or vegetable juices, starch, or surimi), in the pharmaceutical or cosmetics industries, and in the chemical industry.

SUMMARY OF THE INVENTION

The present invention more particularly relates to an apparatus for the separation by filtration, in which a pressure is exerted during the filtration operation on the sludge, so as to accelerate the filtration of the liquid phase and to separate, on the filter, a solid phase in the form of a well-dried cake having a low residual liquid content, the cake being subsequently detached mechanically from the filter.

Apparatuses of this type are known, in which the sludge or suspension is introduced between two filtering bands, and the two bands are subsequently passed between one or more pairs of rolls. It is also known, for example according to EP-A 295,339, to compress the sludge or the suspension in a space contained between a rotary drum and a filter consisting of a band surrounding the rotary drum and in contact with the latter over a defined cylinder segment, the filter in the form of a band being capable of acting as a drive belt for the rotary cylinder. These apparatuses comprising filtering bands are relatively fragile, the bands requiring frequent changing and not generally making it possible to obtain a cake which has a moisture content which is as low as desired and making it possible to treat large quantities of sludges.

The invention relates to an apparatus which is robust, comprising neither a filtering band nor a rotary part, which makes it possible to improve the drying of the filter cake and to obtain a liquid phase having a low content of suspended materials and which makes it possible to treat large quantities of sludges. In this apparatus, a pressure is exerted on the sludge with the aid of a piston in a filtration chamber comprising a filter, then the filter is extracted from the filtration chamber and the surface of the filter extracted from the chamber is swept using a scraper device.

The primary object of the present invention is therefore an apparatus for separation by filtration of a solid phase and a liquid phase from a sludge, the said apparatus comprising, on the one hand, a filter and a compression means for exerting a pressure on the sludge during filtration, so as to obtain on the filter a solid phase cake and to collect a liquid phase which has passed through the filter and, on the other hand, a scraper device for detaching the said cake from the surface of the filter, characterized in that it comprises a filtration chamber and in that the compression means is a piston capable of a relative translational movement with respect to the said filtration chamber, the piston/chamber relative movement being carried out in a substantially liquid-tight manner, the filter being capable of a relative translational movement with respect to the said filtration chamber between a filtration position in which the said filter forms a wall of the said filtration chamber and a scraping position in which the filter is outside the said filtration chamber, and in that the scraper device is capable of sweeping the surface of the filter when the filter is in the scraping position, in order to detach the solid phase cake from the filter.

For preference, the filtration chamber is fixed and the piston moves along the axis of the filtration chamber, between a so-called "retracted" position, allowing filling of the filtration chamber, and a compression position close to the filter at the end of filtration, while the filter is in the filtration position. The filter moves, for preference, advantageously along the same axis as the piston. The scraper device may advantageously move in a plane perpendicular to the axis of the filtration chamber, its displacement being, for preference, a linear translation.

The filtration chamber is, for preference, provided with a sludge feed conduit comprising a valve, the said conduit emerging in the said filtration chamber between the piston in the retracted position and the filter in the filtration position. The filtration chamber may also be provided with a conduit for feeding water for washing the filtration cake, which opens directly either into the filtration chamber or into the sludge feed conduit, advantageously downstream of the valve of the feed conduit.

For preference, the filter forms part of an assembly forming an enclosure, the said filter constituting the face of the said enclosure which is turned towards the said piston and a conduit, for withdrawing the liquid phase, opening into a wall of the conduit other than that constituted by the filter, for preference, into the wall opposite the filter. Advantageously, the said enclosure is connected to a source of air, preferably compressed air, making it possible to blow air through the filter so as to clean it. According to a preferred embodiment, the enclosure comprises a pipe so as to blow air jets through the filter.

The scraper device may be any known device such as a knife, a flexible blade, a rake or a brush.

The apparatus may comprise a second chamber, communicating at one of its ends with the filtration chamber, which is advantageously open at its opposite end; this second chamber contains the filter in the scraping position, after extraction from the first chamber, and its walls essentially have the purpose of channelling the solid phase cake particles detached from the filter. This second chamber has, for preference, cross-sectional dimensions which are greater than the first chamber, so as to allow the scraper device to sweep the entire surface of the filter and for the scraped solid phase to have sufficient room to fall from the filter. However, in one variant, it is possible to replace the second chamber by a simple support (in particular an angle bracket) on which the scraper device and, optionally, the filtration chamber and the device for translational movement on the filter are fixed.

The apparatus according to the invention advantageously comprises actuators for actuating the displacement of the piston, of the filter and, optionally, of the scraper device. The apparatus may also comprise the elements necessary for automatic operation in sequences, including the usual safety measures; these elements are well-known to persons skilled in the art.

The apparatus according to the invention is, for preference, arranged "vertically", the piston and the filter moving along vertical axes and the scraper device moving in a horizontal plane; it might, however, be possible to operate it by arranging the axis of the filtration chamber horizontally.

The second subject of the present invention is a method for separation by filtration, in which a pressure is exerted on the sludge during filtration, which method can be employed in the described apparatus.

According to this method:
in a first step, a quantity of sludge to be filtered is introduced into a filtration chamber, one wall of which consists of a filter;
in a second step, a pressure is exerted on the sludge contained in the filtration chamber so as to obtain, on the filter, a solid phase cake and to collect a liquid phase after it has passed through the filter;
in a third step, the pressure is released, the filter is extracted from the filtration chamber, so as to bring it outside the said filtration chamber, the surface of the filter bearing the filter cake is scraped using a scraper device sweeping the surface of the filter bearing the cake and the solid phase falling from the filter is collected;
in a fourth step, the filter is returned to the filtration position.

For preference, between the third and fourth steps, air is blown through the filter so as to clean it. Between the third and fourth steps, a step of washing the filter cake may also be introduced.

For preference, in the first step, a piston constitutes the cover of the filtration chamber. In the second step, for preference, the said piston is displaced longitudinally along the axis of the filtration chamber in the direction of the filter. In the third step, the filter is, for preference, extracted from the filtration chamber by a translational movement along the axis of the filtration chamber. In the fourth step, for preference, the scraper device is displaced in a linear translational movement between an inactive position and an end-of-travel position in which the surface of the filter has been entirely swept. When the method comprises an operation of blowing air through the filter, this operation is, for preference, carried out when the scraper device is in the end-of-travel position.

The third subject of the present invention is the use of at least one apparatus according to the invention in the treatment of liquid manure, more particularly pig liquid manure.

DESCRIPTION OF THE DRAWING

The description given hereinbelow, with reference to the attached drawing, will better explain the invention.

In this drawing.

DESCRIPTION OF THE INVENTION

Figure 3:
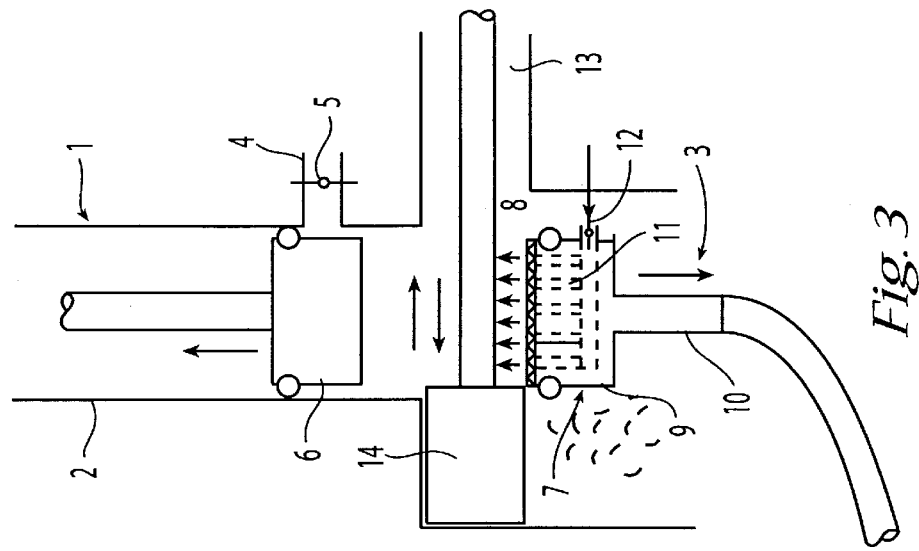
FIGS. 1 to 3 diagrammatically represent, in vertical section, an apparatus according to the present invention at different steps in the filtration process.
Figure 2:
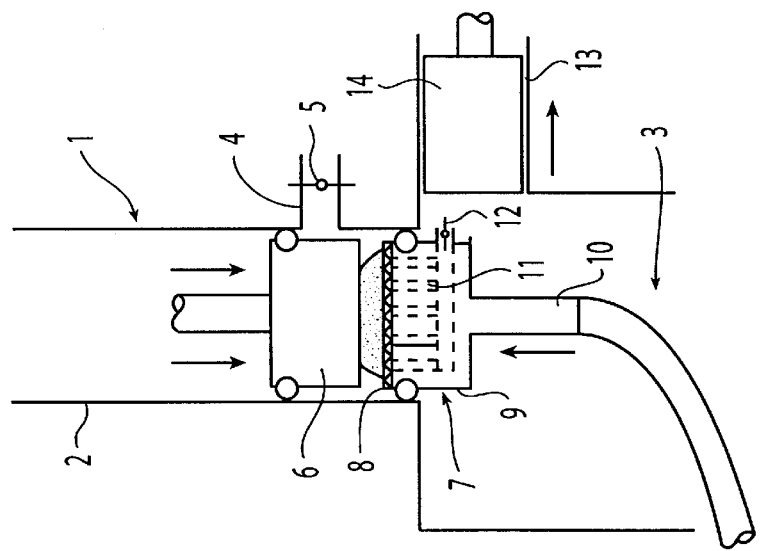
Figure 1:
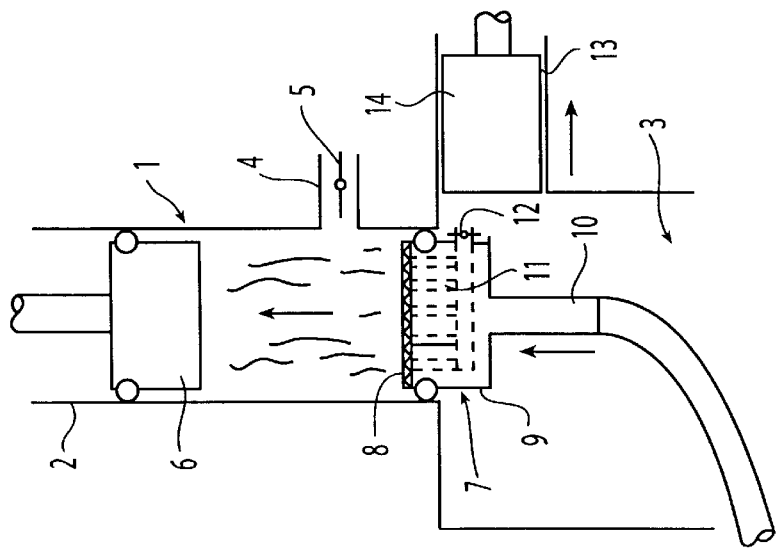

FIGS. 1 to 3 show that the apparatus according to the invention, denoted in its entirety by the reference 1, is arranged "vertically"; it consists of two chambers 2 and 3, located one above the other and communicating with each other; these chambers have different dimensions, the chamber 3 having in horizontal section dimensions larger than those of the chamber 2. The chamber 2 is the filtration chamber; it comprises a side wall, in which a sludge feed conduit 4 provided with a valve 5 emerges. The valve 5 advantageously consists of a ball cock, but may also be a flap valve. The chamber 2 contains a piston 6 which can slide, along a vertical axis, in a liquid-tight manner, in the chamber 2 between a retracted position located above the feed conduit 4 (see FIG. 1) and a position of compressing the solid phase cake (see FIG. 2). The piston 6 is actuated, in particular, by a hydraulic actuator system (not shown). An assembly 7 forming an enclosure comprising a horizontal filter 8 is mounted in the apparatus so that it can move between two positions: a first position in which the assembly 7 forms the bottom of the chamber 2 (see FIG. 1) and separates the chamber 2 from the chamber 3 and a second position in which it is extracted from the chamber 2 and it is arranged in the chamber 3 (see FIG. 3). The assembly 7 consists of an enclosure 9, for example cylindrical, formed at its upper part by the filter 8. A conduit 10 for withdrawal of the liquid phase connects with the bottom of the enclosure 9. A pipe for blowing out air, connected by a valve 12 to a compressed air source, is arranged in the enclosure 9. The assembly 7 is actuated in vertical translation, in particular by a hydraulic actuator system (not shown). The chamber 3 is open at its lower part so as to allow withdrawal of the solid phase by gravity. The walls of the chamber 3 guide the solid phase cake particles falling from the filter 8 during the scraping and prevent dispersion of these particles, for example by the wind. It comprises, at its upper part, in a lateral housing 13 projecting outwards, a scraper member 14 which can be moved linearly in translation in a horizontal plane so as to scrape the upper surface of the filter 8 when the assembly 7 is arranged in the chamber 3 in the scraping position. This scraper member consists, in particular, of a knife or a flexible blade. It is, in particular, actuated by a hydraulic actuator or a motor (not shown).

The apparatus functions as follows. In a first step a) (see FIG. 1) the piston 6 is in the retracted position and it is arranged above the sludge feed conduit 4 and the assembly 7 forms the bottom of the chamber 2. The valve 5 of the conduit 4 is opened and a quantity of sludge is introduced into the chamber 2. The valve 5 is then closed and the supply of sludge to the chamber 2 is thus interrupted. In a second step b) (see FIG. 2), the piston 6 is gradually lowered along the axis of the filtration chamber 2 so as to exert a pressure on the sludge and to accelerate the formation of a solid phase cake on the filter 8. The liquid phase passes through the filter and it is collected in the enclosure 7 then withdrawn from the enclosure via the conduit 10. When no more, or practically no more, liquid phase is being withdrawn via the conduit 10, in a third step c) (see FIG. 3), return of the piston 6 to its retracted position is commenced and the assembly 7 is lowered in the chamber 3 by a translational movement having the same axis as the piston as far as a level such that the scraper means 14 can scrape the upper surface of the filter 8. This translation is, in particular, actuated by actuators. The scraper device 14 is then actuated in linear translation in a horizontal plane so as to sweep the entire upper surface of the filter 8 and to cause the cake to drop into the chamber 3. The dimensions of the chamber 3 are such that they allow the scraper device 14 to sweep the entire surface of the filter and the solid phase cake to fall freely into the chamber 3. The solid phase is collected by any known means at the open lower part of the chamber 3. The solid phase is, for example, collected in a container, a hopper, a sack or on a conveyor belt. The collected solid phase may optionally be subjected to a subsequent treatment, for example a drying treatment.

After the third step c), when the scraper means 14 is at the end of travel, having swept the entire surface of the filter 8, the valve 12 is opened so as to introduce compressed air into the pipe 11. The air passes through the filter, which is thus cleaned from the solid phase particles which might have remained there. The scraper means 14 is then returned into its housing 13, the scraper means causing the solid phase particles detached from the filter by the compressed air to fall into the chamber 3.

In a fourth step d), the piston is returned into its retracted position, represented in FIG. 1, and the assembly 7 is returned into the position represented in FIG. 1, where it forms the bottom of the chamber 2. The apparatus is then ready to receive a new quantity of sludge to be treated.

Figure 4:
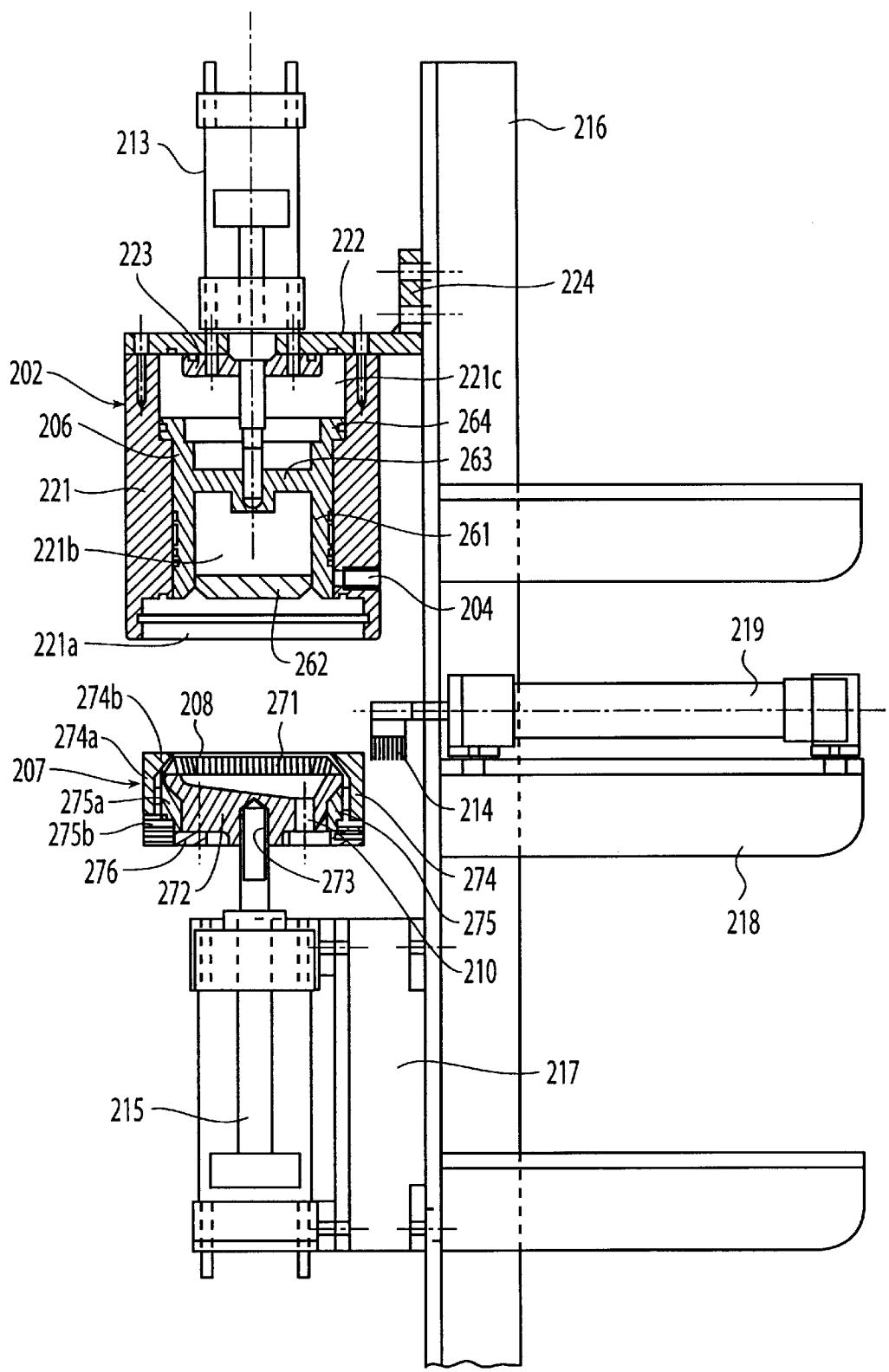
FIG. 4 represents, in more detail, a filtration apparatus according to the present invention.

FIG. 4 represents, in more detail, one embodiment of a filtration apparatus according to the present invention. It comprises a cylinder 202 in which a piston 206 and an assembly 207 bearing the filter 208 move in translation. The piston 206 is actuated in translation by an actuator 213 and the assembly 207 is actuated in translation by an actuator 215. The cylinder 202 and the actuator 215 are fixed to an angle bracket 216, the actuator 215 being fixed to the angle bracket 216 by means of a support 217. The cylinder 202 consists of a side wall 221; at its upper part, the cylinder 202 is closed by a flange 222 fixed on the upper rim of the side wall 221 and provided with an axial opening for passage of the rod of the actuator 213. The body of the actuator 213 is fixed on the flange 222 and sealing between the actuator 213 and the flange 222 is ensured by means of a stuffing box 223 fixed under the flange 222. On its periphery, the flange 222 bears a perpendicular mounting flange 224 used for fastening the cylinder 202 onto the angle bracket 216.

The cylinder 202 comprises three sections having different diameters, by virtue of the variation in the thickness of the wall 221. The first section 221a, located at its lower part, has a diameter which is equal, to within the necessary play, to the external diameter of the assembly 207 bearing the filter 208, so that the said assembly 207 can be inserted exactly. In order to ensure sealing between the assembly 207 and the section 221a, annular seals are provided which are borne by the cylinder 202 and are caused to interact with the side and front walls of the assembly 207; FIG. 4 represents only the grooves for fitting the said seals. The second section 221b has a smaller diameter which is equal, to within the necessary play, to the external diameter of the piston 206; a feed conduit 204 provided with a valve (not shown) is made in the side wall of this second section, at its lower part. The third section 221c has a diameter greater than that of the section 221b.

The piston 206 is defined by a cylindrical wall 261 having an external diameter which is equal, to within the necessary play, to the diameter of the section 221b of the cylinder 202. According to the embodiment represented, this cylindrical wall comprises on the outside three peripheral grooves making it possible to arrange the annular seals intended to provide sealing. At its base, the cylindrical wall 261 is closed by a planar welded plate 262. A second plate 263, which is parallel to the first and comprises a tapped axial housing intended to receive the threaded end of the rod of the actuator 213, is arranged at an intermediate level. At its upper part, the cylindrical wall 261 bears a collar 264, the external diameter of which is equal, to within the necessary play, to the diameter of the section 221c of the cylinder 202; the lateral surface of the collar 264 bears a groove making it possible to arrange an O-ring seal intended to ensure sealing.

The assembly 207 consists of a filtration cloth 208 clamped on a support 271 in which numerous openings are made. The support 271 rests on a body 272, the upper surface of which is inclined so as to form a funnel opening into a conduit 210 for withdrawal of the filtered liquid, which is arranged out of the axis of the assembly 207. On the lower face of the body 272, a tapped bore 273 intended to receive the end of the actuator 215 has been made axially. The side wall of the body 272 is cylindrical at its lower part, then frustoconical, widening upwards. The filtration cloth 208, its holder 271 and the body 272 are held together using three parts: first, a clamping nut 274 comprising, on the one hand, at its lower part, a cylindrical skirt 274a provided on its inner face with a screw thread and, on the other hand, at its upper part, a collar 274b oriented towards the axis of the nut and bearing via a bevelled edge on the corresponding bevelled edge of the support 271 so as to hold the filtration cloth by clamping; secondly, a ring 275 comprising a cylindrical skirt 275a, which is provided on its outer face with a screw thread capable of interacting with the screw thread of the skirt 274a and having its upper edge bevelled so as to provided contact with the frustoconical part of the side wall of the body 272, the said ring 275 comprising, at its lower part, an annular plate 275b, on the inner edge of which the skirt 275a joins; and, thirdly, a dismounting washer 276 having the shape of a disc and provided over its entire periphery with bores used for engaging with a tool for tightening and untightening, this washer being arranged under the body 272 and being solidly attached by screws perpendicular to the cloth 208, the said screws passing through the washer via the bores (not shown). Once the washer 276 is fixed on the body 272, the assembly 207 can be screwed and unscrewed onto and from the threaded end of the rod of the actuator 215 without causing relative rotation of the body 272 and of the clamping nut 274.

On the angle bracket 216, the scraper system is fixed on a console 218. It consists of a brush 214 fixed to the end of the rod of an actuator 219 so as to move linearly and to rub on the filter cloth 208 in order to detach the filter cake when the assembly 207 is located out of the cylinder 202, as represented in FIG. 4.

Figure 5:
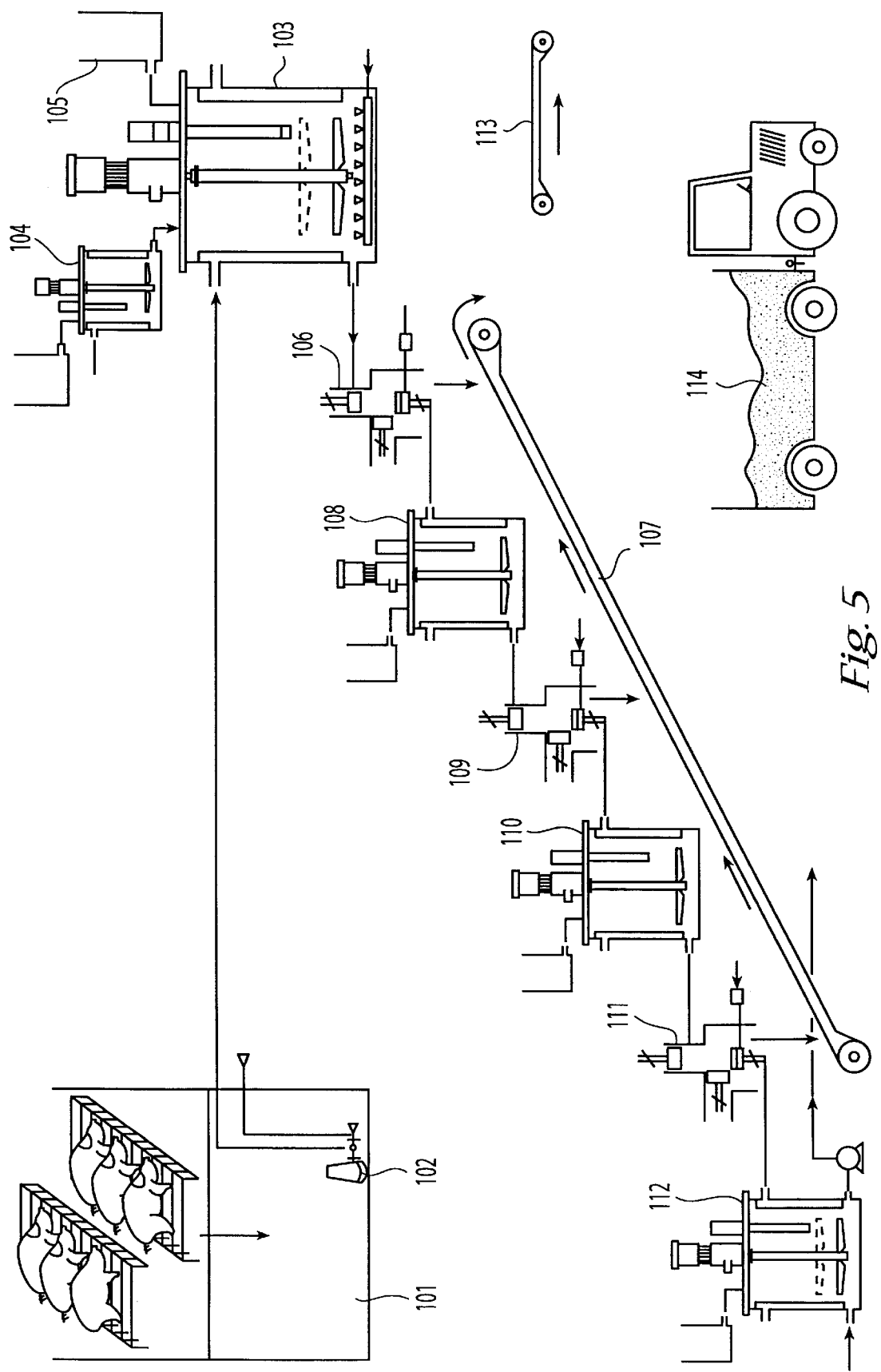
FIG. 5 diagrammatically represents an installation for treating liquid pig manure, using three filtration apparatuses according to the invention, arranged in series.

FIG. 5 diagrammatically represents the use of the filtration apparatus according to the invention in a method for treating liquid pig manure. In the method represented in FIG. 5, use is made of three filtration apparatuses in series, in which the filters consist of screens having decreasing nominal diameter.

As can be seen in FIG. 5, the liquid pig manure is collected in a ditch 101; it is first homogenized with the aid of an aerating/water-ejecting pump assembly 102 so as to reduce the biological oxygen demand at 5 days (BOD 5), the chemical oxygen demand (COD) and the suspended matter (SM). The liquid manure is then pumped and sent into a tank 103 where the pH is adjusted using two reactants coming from the tank 104, for example sodium hydroxide or hydrochloric acid so as to neutralize the liquid manure, and from the reservoir 105, for example calcium superphosphate or ferric chloride so as to produce flocculation. The ammonia, the amines and the fatty acids are thus removed. The treated liquid manure is then sent to a first filtration apparatus 106 comprising a relatively coarse screen (having nominal pore opening diameter of approximately 1500 microns, for example) in which a solid phase which is collected on a conveyor belt 107 and a liquid phase which is introduced into a tank 108 are separated, in which tank 108 the said liquid phase is neutralized, for example with sodium hydroxide. The treated liquid phase is introduced into a second filtration apparatus 109 comprising a finer filtration screen (for example with nominal pore opening diameter of approximately 500 microns); a solid phase which is collected on the conveyor belt 107 is thus separated from a liquid phase which is sent into a tank 110. In a tank 110, the liquid phase is treated with a deodorizing reactant. The deodorized product is sent into a third filtration apparatus 111 comprising a fine screen (having, for example, a nominal pore opening diameter of approximately 100 microns). A solid phase which is collected on the conveyor belt 107 and a liquid phase which is introduced into a tank 112 are separated, in which tank 112 this liquid phase is aerated and treated with an oxidizing agent, for example $H_2O_2$ and/or sodium perborate and an odour-masking agent, for example undecylenic acid and/or its aliphatic esters.

If it is desired to carry out filtration with a filter having a nominal pore opening diameter of less than 40 microns, use is made of a nylon filter inserted between two fine screens having, for example, a nominal pore opening diameter of approximately 100 microns.

The liquid phase leaving the tank 112 can be discharged as surface water because it is depolluted and deodorized. The solids collected on the conveyor belt can either be sent to a drying installation, for example using a conveyor belt 113, or be loaded onto a tractor trailer 114 or a lorry in order to be composted. Tests have shown that treating 1000 $dm^3$ of liquid manure produces 680 $dm^3$ of surface water and 320 $dm^3$ of solids containing 25% of water and containing approximately 98% of suspended matter in the liquid manure. These solids exhibit no olfactory nuisance.

What is claimed is:

1. An apparatus for the separation by filtration of a solid phase and a liquid phase from a sludge, said apparatus comprising
   a filter (8) having at least one substantially planar surface and a compression means (6) for exerting a pressure on the sludge during filtration to obtain on the substantially planar surface of said filter a 'solid phase cake and to collect a liquid phase which has passed through said filter and
   a scraper device (14) for detaching said cake from the substantially planar surface of said filter, wherein said apparatus comprises a filtration chamber (2) and wherein said compression means is a piston (6) capable of a relative translational movement with respect to said filtration chamber, the piston/chamber relative movement being carried out in a substantially liquid-tight manner, said filter being capable of a relative translational movement with respect to said filtration chamber between a filtration position in which said filter forms a wall of said filtration chamber and a scraping position in which said filter is outside of said filtration chamber, and wherein said scraper device is capable of sweeping the surface of said filter, when said filter is in the scraping position, in order to detach the solid phase cake from said filter.

2. The apparatus of claim 1, wherein said filtration chamber is fixed and said piston moves along the axis of said filtration chamber between a retracted position and a compression position close to the substantially planar surface of said filter.

3. The apparatus of claim 2, wherein said filter moves along the same axis as said piston.

4. The apparatus of claim 1, wherein said scraper device moves in a plane perpendicular to the axis of said filtration chamber.

5. The apparatus of claim 4, wherein the displacement of said scraper device is a linear translation.

6. The apparatus of claim 1, wherein said filtration chamber is provided with a sludge feed conduit (4) comprising a valve (5).

7. The apparatus of claim 1, wherein said filter forms part of an enclosure (7), the substantially planar surface of said filter constituting the face of said enclosure turned towards said piston.

8. The apparatus of claim 1, further comprising a second chamber (3), which second chamber communicates at one end with said filtration chamber and is open at its opposite end.

9. The apparatus of claim 1, further comprising actuators for actuating the displacements of said piston, an enclosure, and said scraper device.

10. A method for the separation by filtration of a solid phase and a liquid phase from liquid manure using at least one apparatus according to claim 1, said method comprising the steps:
    (a) introducing a quantity of sludge to be filtered into a filtration chamber (2), one wall of which is comprised of a substantially planar surface of a filter (8) in a filtration position;
    (b) exerting pressure on the sludge in said filtration chamber so as (i) to obtain, on the substantially planar surface of said filter, a solid phase cake and (ii) to collect a liquid phase after it has passed through said filter;
    (c) releasing said pressure;
    (d) extracting said filter from said filtration chamber so as to bring it outside of said filtration chamber;
    (e) scraping said substantially planar surface of the filter bearing the filter cake using a scraper device (14) in order to sweep said cake off of said surface and to cause said cake to fall;
    (f) collecting the solid phase filter cake falling from said filter; and
    (g) collecting the liquid phase passing through said filter.

11. The method of claim 10, wherein at least two apparatuses are used in series, wherein there is at least an initial apparatus and at least a final apparatus and wherein each apparatus comprises a filter having at least one substantially planar surface and a compression means for exerting a pressure on the sludge during filtration to obtain on the substantially planar surface of said filter a solid phase cake and to collect a liquid phase which has passed through said filter and a scraper device for detaching said cake from the substantially planer surface of said filter, wherein each apparatus comprises a filtration chamber and wherein said compression means is a piston capable of a relative translational movement with respect to said filtration chamber, the piston/chamber movement being carried out in a substantially liquid-tight manner and wherein said scraper device is capable of sweeping the surface of said filter.

12. A method for the separation by filtration of a solid phase and a liquid phase from liquid manure using at least one apparatus according to claim 1, said method comprising the steps:
    (a) introducing a quantity of sludge to be filtered into a filtration chamber (2), one wall of which is comprised of a substantially planar surface of a filter (8) in a filtration position;

(b) exerting pressure on the sludge in said filtration chamber so as (i) to obtain, on the substantially planar surface of said filter, a solid phase cake and (ii) to collect a liquid phase after it has passed through said filter;

(c) releasing said pressure;

(d) extracting said filter from said filtration chamber so as to bring it outside of said filtration chamber;

(e) scraping said substantially planar surface of the filter bearing the filter cake using a scraper device (14) in order to sweep said cake off of said surface and to cause said cake to fall;

(f) collecting the solid phase filter cake falling from said filter; and (g) collecting the liquid phase passing through said filter, wherein two or more apparatuses for the separation by filtration of a solid phase and a liquid phase from a sludge, said apparatus comprising a filter (8) having at least one substantially planar surface and a compression means (6) for exerting a pressure on the sludge during filtration to obtain on the substantially planar surface of said filter a solid phase cake and to collect a liquid phase which has passed through said filter and a scraper device (14) for detaching said cake from the substantially planar surface of said filter, wherein said apparatus comprises a filtration chamber (2) and wherein said compression means is a piston (6) capable of a relative translational movement with respect to said filtration chamber, the piston/chamber relative movement being carried out in a substantially liquid-tight manner, said filter being capable of a relative translational movement with respect to said filtration chamber between a filtration position in which said filter forms a wall of said filtration chamber and a scraping position in which said filter is outside of said filtration chamber, and wherein said scraper device is capable of sweeping the surface of said filter, when said filter is in the scraping position, in order to detach the solid phase cake from said filter are used in series and wherein the filters of said at least two apparatuses comprise screens having nominal diameters that decrease from the initial apparatus to the final apparatus in the series.

13. The method of claim 12, wherein the solid phase filter cake falling from the initial apparatus is transported to a subsequent apparatus by means of a conveyor belt.

14. The method of claim 12, wherein said liquid phase is treated with a deodorizing reactant.

15. An apparatus for the separation by filtration of a solid Phase and a liquid phase from a sludge, said apparatus comprising a filter (8) having at least one substantially planar surface and a compression means (6) for exerting a pressure on the sludge during filtration to obtain on the substantially planar surface of said filter a solid phase cake and to collect a liquid phase which has passed through said filter and a scraper device (14) for detaching said cake from the substantially planar surface of said filter, wherein said apparatus comprises a filtration chamber (2) and wherein said compression means is a piston (6) capable of a relative translational movement with respect to said filtration chamber, the piston/chamber relative movement being carried out in a substantially liquid-tight manner, said filter being capable of a relative translational movement with respect to said filtration chamber between a filtration position in which said filter forms a wall of said filtration chamber and a scraping position in which said filter is outside of said filtration chamber, and wherein said scraper device is capable of sweeping the surface of said filter, when said filter is in the scraping position, in order to detach the solid phase cake from said filter, wherein said filtration chamber is provided with a water-wash feed conduit.

16. An apparatus for the separation by filtration of a solid phase and a liquid phase from a sludge, said apparatus comprising a filter (8) having at least one substantially planar surface and a compression means (6) for exerting a pressure on the sludge during filtration to obtain on the substantially planar surface of said filter a solid phase cake and to collect a liquid phase which has passed through said filter and a scraper device (14) for detaching said cake from the substantially planar surface of said filter, wherein said apparatus comprises a filtration chamber (2) and wherein said compression means is a piston (6) capable of a relative translational movement with respect to said filtration chamber, the piston/chamber relative movement being carried out in a substantially liquid-tight manner, said filter being capable of a relative translational movement with respect to said filtration chamber between a filtration position in which said filter forms a wall of said filtration chamber and a scraping position in which said filter is outside of said filtration chamber, and wherein said scraper device is capable of sweeping the surface of said filter, when said filter is in the scraping position, in order to detach the solid phase cake from said filter, wherein said filter forms part of an enclosure (7), the substantially planar surface of said filter constituting the face of said enclosure turned towards said piston and wherein said enclosure is connected to an air supply.

17. The apparatus of claim 9, wherein said enclosure comprises a blowing pipe (110) sending air jets through said filter.

18. A method for the separation by filtration of a solid phase and a liquid phase from a sludge in which pressure is exerted on the sludge during filtration, comprising the steps:

(a) introducing a quantity of sludge to be filtered into a filtration chamber (2), one wall of which is comprised of a substantially planar surface of a filter (8) in a filtration position;

(b) exerting pressure on the sludge in said filtration chamber so as (i) to obtain, on the substantially planar surface of said filter, a solid phase cake and (ii) to collect a liquid phase after it has passed through said filter;

(c) releasing said pressure;

(d) extracting said filter from said filtration chamber so as to bring it outside of said filtration chamber;

(e) scraping said substantially planar surface of the filter bearing the filter cake using a scraper device (14) in order to sweep said cake off of said surface and to cause said cake to fall;

(f) collecting the solid phase filter cake falling from said filter; and (g) returning said filter to its filtration position.

19. A method for the separation by filtration of a solid phase and a liquid phase from a sludge in which pressure is exerted on the sludge during filtration, comprising the steps:

(a) introducing a quantity of sludge to be filtered into a filtration chamber (2), one wall of which is comprised of a substantially planar surface of a filter (8) in a filtration position;

(b) exerting pressure on the sludge in said filtration chamber so as (i) to obtain, on the substantially planar surface of said filter, a solid phase cake and (ii) to collect a liquid phase after it has passed through said filter;

(c) releasing said pressure;

(d) extracting said filter from said filtration chamber so as to bring it outside of said filtration chamber;

(e) scraping said substantially planar surface of the filter bearing the filter cake using a scraper device (14) in order to sweep said cake off of said surface and to cause said cake to fall;

(f) collecting the solid phase filter cake falling from said filter; and (g) returning said filter to its filtration position, further comprising blowing air through said filter prior to returning said filter to its filtration position.

20. A method for the separation by filtration of a solid phase and a liquid phase from a sludge in which pressure is exerted on the sludge during filtration, comprising the steps:

(a) introducing a quantity of sludge to be filtered into a filtration chamber (2), one wall of which is comprised of a substantially planar surface of a filter (8) in a filtration position;

(b) exerting pressure on the sludge in said filtration chamber so as (i) to obtain, on the substantially planar surface of said filter, a solid phase cake and (ii) to collect a liquid phase after it has passed through said filter;

(c) releasing said pressure;

(d) extracting said filter from said filtration chamber so as to bring it outside of said filtration chamber;

(e) scraping said substantially planar surface of the filter bearing the filter cake using a scraper device (14) in order to sweep said cake off of said surface and to cause said cake to fall;

(f) collecting the solid phase filter cake falling from said filter; and (g) returning said filter to its filtration position, further comprising washing said filter cake.

* * * * *